C. H. BERRY.
COMPENSATING GAUGE.
APPLICATION FILED APR. 24, 1920.

1,420,953.

Patented June 27, 1922.
4 SHEETS—SHEET 1.

C. Harold Berry INVENTOR.

BY

Shepherd & Campbell ATTORNEYS.

C. H. BERRY.
COMPENSATING GAUGE.
APPLICATION FILED APR. 24, 1920.

1,420,953.

Patented June 27, 1922.

C. Harold Berry — INVENTOR.

BY

Shepherd & Campbell — ATTORNEYS

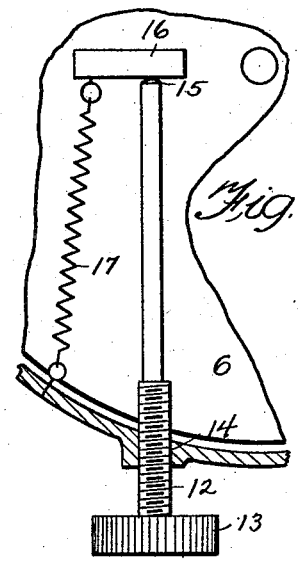
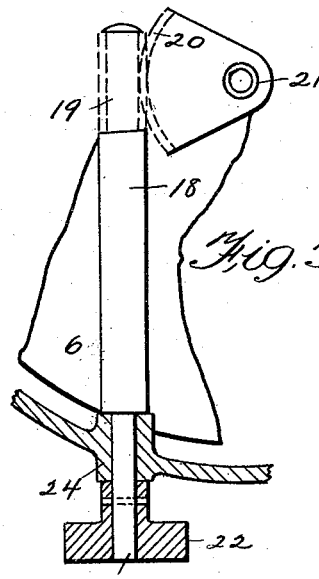
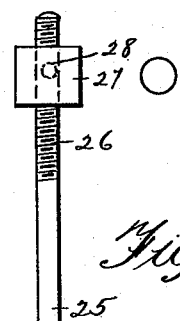
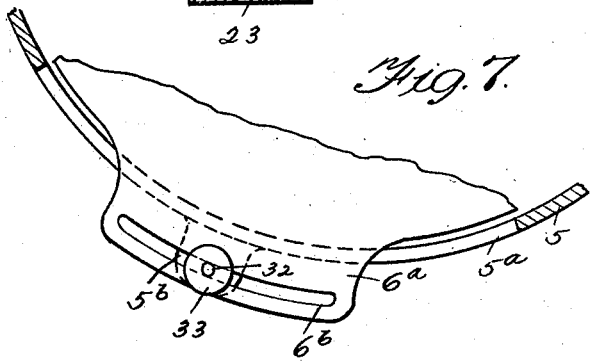
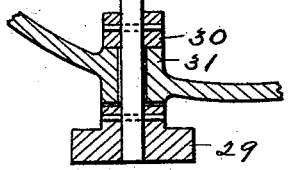

UNITED STATES PATENT OFFICE.

CHARLES HAROLD BERRY, OF DETROIT, MICHIGAN.

COMPENSATING GAUGE.

1,420,953.  Specification of Letters Patent.  Patented June 27, 1922.

Application filed April 24, 1920. Serial No. 376,365.

*To all whom it may concern:*

Be it known that I, CHARLES HAROLD BERRY, citizen of the United States, residing at Detroit, in the county of Wayne and State of Michigan, have invented certain new and useful Improvements in Compensating Gauges, of which the following is a specification, reference being had therein to the accompanying drawings.

The object of the present invention is to provide a gauge constructed in such manner that the true absolute pressure may be ascertained therefrom, without computation, irrespective of variations in atmospheric pressure.

The present invention contemplates the provision of a gauge having a dial graduated in terms of absolute pressure, mounted for movement with respect to the case of the gauge, and provided with means whereby the said dial may be accurately adjusted by hand to compensate for variations in atmospheric pressure as determined by a reading of the barometer.

In my copending application, Serial Number 376,366, filed on the 24th day of April, 1920, I have disclosed a construction wherein the movement of the dial to compensate for variations in atmospheric pressure is under the influence of an aneroid barometer so that such compensatory movement of the dial is rendered entirely automatic. According to the present application, however, the movement of the dial is effected manually.

Further objects and advantages of the invention will be set forth in the detailed description which now follows.

Figure 1:
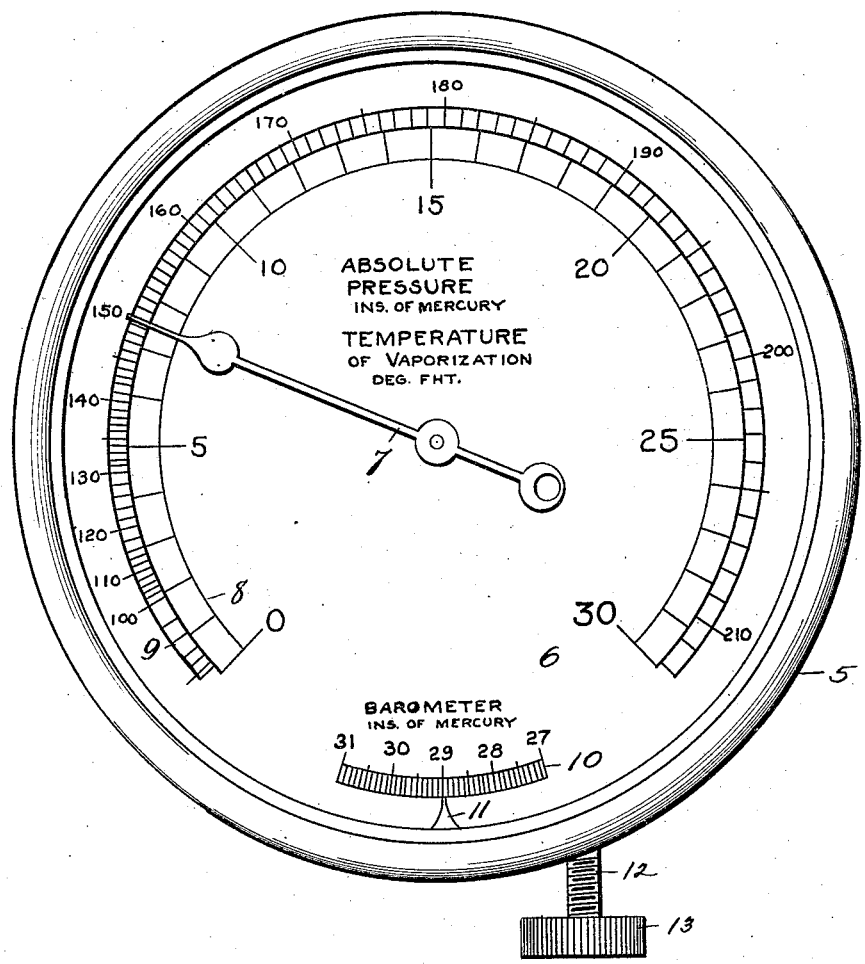
Figure 1 is a face view of a gauge provided with a movable dial having scales indicative of the absolute pressure in inches of mercury and of the temperature of vaporization of water in degrees Fahrenheit.

Figs. 4, 5, 6, and 7 illustrate modifications of the dial shifting means; and

Figs. 8 and 9 are sectional views through the case, illustrating a pointer which co-operates with a barometric scale formed upon each of the dials aforesaid, said barometric scale being so graduated and so correlated with the indicating scales of the several dials that when the dial is shifted to a degree to meet variations in atmospheric pressure as indicated by a reading of a barometer it will also be shifted the proper distance with respect to the main indicating pointer of the gauge to cause resultant readings to indicate true absolute pressure whether this is above or below the then existing atmospheric pressure, whatever that may be.

Like numerals designate corresponding parts throughout the several figures of the drawing.

Referring to the drawings and particularly to Fig. 1; 5 indicates the case of a gauge having a dial 6. The gauge shown is of the well known Bourdon tube type and is provided with a pointer 7 movable over the dial 6. The dial is graduated to form scales 8 and 9, with which the pointer 7 cooperates, the scale 8 indicating absolute pressure in inches of mercury and the scale 9 indicating the temperature of vaporization of water in degrees Fahrenheit.

The dial is further provided with a scale 10 which may be termed a barometric scale and which may be graduated in any suitable units, as inches or millimeters of mercury. This scale registers against a pointer 11 that is carried by the case 5.

Any suitable means may be employed for imparting movement to the dial with relation to the case such, for example, as the screw 12. This screw is provided with a knurled head 13 and is threaded into the case at 14 Fig. 4. Its end 15 bears against a block or other projection 16 that is fixed to the dial. A tension spring 17 is connected to the block 16 and to the casing 5 and keeps the block in firm contact with the end of the screw.

In Fig. 5, 18 designates a shaft carrying a worm 19 meshing with a worm sector 20 that is mounted upon a sleeve 21, which carries the dial. Rotation may be manually imparted to the shaft 18 by means of a head 22, which is preferably knurled. The head is carried by a reduced portion 23 of the shaft, which is mounted to turn in a bearing 24 of the case 5.

In Fig. 6, 25 indicates a rod that is threaded at 26 to engage in a nut 27 that is pivoted at 28 to the dial. The lower end of the rod 25 is provided with a knurled head 29 and said rod carries a collar 30, disposed inwardly of a bearing 31 of the case 5.

In Fig. 7, the case 5 is slotted at 5ª to permit an extension 6ª of the dial to project therethrough. This extension is provided with a slot 6ᵇ which is traversed by the stem 32 of a clamp screw 33, said screw engaging in an ear 5ᵇ of the case 5.

While I have illustrated these several ways of actuating the dial it is to be understood that any suitable actuating means may be employed since it is manifest that it is possible to rotate the dial by many different mechanisms.

The pointer 11, see Figs. 8 and 9, is traversed by a screw 34 that is movable bodily in a slot 35. This screw is threaded into a block 36; this construction permitting of adjustment of the pointer 11, after which the pointer may be fixed tightly in adjusted position by means of the screw.

The pointer 11 performs the double function of cooperating with the scale 10 and of providing means for the calibration of the gauge. As is well known Bourdon tube gauges gradually shift their zero points with age and sustained pressure. The method commonly employed for correcting this is to remove the pointer from the stem and press it on again in a new position so that the gauge registers correctly. With the movable pointer 11 small adjustments may be made much more quickly and accurately. Large corrections, when necessary, could be made approximately, by removing the pointer in the old way, the final adjustment being secured by the small movement of the said pointer.

Figure 2:
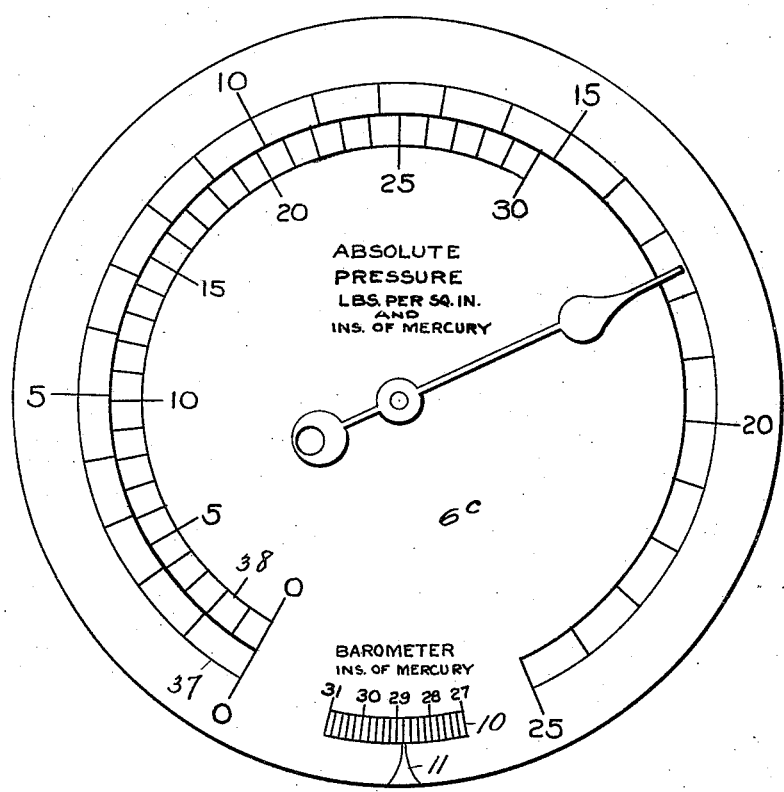
Fig. 2 is a front elevation of a dial provided with scales indicative of the absolute pressure in pounds per square inch and in inches of mercury.
Figure 3:
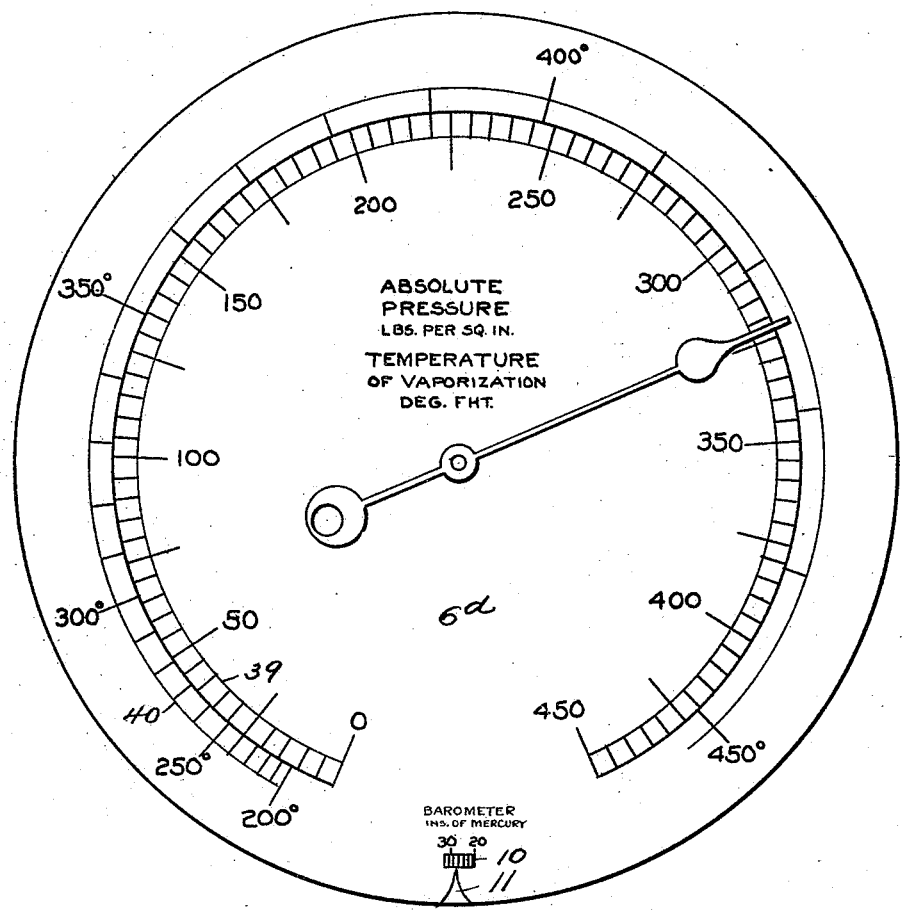
Fig. 3 is a front elevation of a dial provided with scales indicative of the absolute pressure in pounds per square inch and the temperature of vaporization in degrees Fahrenheit.

The principle of operation is, of course, the same with respect to each of the forms shown in Figs. 1, 2 and 3. In Fig. 1, the barometric scale 10 is so correlated with the scales 8 and 9 that if the operator, upon reading the barometer, finds the barometer indicates 30 inches of mercury and shifts the dial by means of the screw 12 and associated parts to bring the numeral 30 in line with the pointer 11 said dial will have been so shifted with respect to the pointer 7 that said pointer will indicate the true absolute pressure below the then prevailing atmospheric pressure. While I prefer to employ a gauge of the Bourdon tube type, it is manifest that the compensatory action achieved through the provision of the movable dial is in no wise dependent upon the nature of the mechanism employed to move the pointer 7 and it will therefore be understood that any suitable mechanism may be employed for this purpose. Fig. 2 illustrates a dial, 6ᶜ, provided with a scale 37 graduated in pounds per square inch, absolute pressure, and a scale 38 graduated in inches of mercury. Such a scale covers the range of the usual compound gauge. In Figure 3, a dial 6ᵈ is provided with a scale 39 graduated in pounds per square inch, absolute pressure, and a scale 40 graduated in degrees Farenheit, indicative of the temperature of vaporization at the several pressures indicated upon the scale 39. From the foregoing description it will be seen that the structure herein shown and described provides a gauge of simple and inexpensive construction adapted to indicate the true absolute pressure above or below the prevailing atmospheric pressure, at a glance. This is highly desirable for the following reasons. Practically all of the gauges in use at the present time are constructed in such manner as to indicate pressures above and below atmospheric pressure, as a datum. In other words, the zero point of the said gauges corresponds to atmospheric pressure instead of corresponding to a complete vacuum. However, since the atmospheric pressure constantly varies it is manifest that such gauges can not accurately represent the absolute pressure existing in the space to which the gauge is connected, because such space has no connecton with the atmosphere and the pressure therein prevailing does not vary with the atmospheric pressure. Therefore in order to produce a gauge that will be entirely accurate I so construct the same that the zero point thereof corresponds to a true vacuum and provide means for so shifting the dial of the gauge with respect to the indicating pointer as to compensate for variations in the atmospheric pressure. The result is to give an entirely accurate reading of the absolute pressure irrespective of how barometric conditions may vary. Under present conditions if it is desired to determine an accurate value of the absolute pressure from an ordinary type of gauge, it is necessary to read both the gauge and the barometer, whose readings must be reduced to the same units, if they are not already in the same units, and added together, if the pressure measured is above atmospheric pressure. In measuring a pressure which is less than atmospheric the vacuum gauge is read, the barometer is read and the reading of the vacuum gauge is subtracted from the barometer reading.

I am aware of the existence of Patent 960,633 to Frerichs. However, Frerichs expresses the vacuum in per cent of the barometer. This renders it necessary to provide the special insertable scales of per cent, each corresponding to a given barometric pressure as disclosed in the Frerichs patent. Such insertable scales are accurate only for the precise barometric pressures for which they are respectively graduated. For intermediate barometric pressures the readings cannot be accurate.

In my invention a single scale of absolute pressure answers for all possible conditions. It is not, ordinarily, desirable to know the per cent of barometer. To make use of it we should have to read the barometer and compute the absolute pressure, which it is my idea to read off directly.

In some cases it is highly desirable to determine quickly and accurately the temperature of vaporization of a substance in process of boiling or evaporating in a boiler, still, evaporator, or other apparatus. In carrying out processes in many of the arts, the operator often must now rely upon approximate methods of determination, or consume valuable time in an accurate determination. A gauge constructed in accordance with the present invention will give the desired information at a glance, and thus give the operator immediate information.

In the graduation of the dials, pressures may be indicated in any units whatever, English, metric, or any other, and in correspondence with the pressure scales there may be scales of temperature of vaporization of any substance, or scales of any other quantity which varies with and depends upon the temperature, such, for example, as scales of the density of saturated vapor, its total heat, or the like.

It is to be understood that the invention is not limited to the precise construction set forth but that it includes within its purview whatever changes fairly come within either the terms or the spirit of the appended claims.

I claim:—

1. A gauge comprising a rotatable dial graduated in terms of absolute pressure, an indicator operative thereover, means for moving the dial with respect to the indicator and a barometric scale for determining the degree of movement of the dial, said barometric scale bearing such relation to the pressure scale of the dial as to cause the movement of the dial in accordance with the barometric scale, to compensate for variations of atmospheric pressure.

2. A gauge comprising a case, a rotatable dial graduated in terms of absolute pressure in pounds per square inch, an indicator operative thereover, manually operative means for rotating the dial with respect to the case, a pointer carried by the case and a barometric scale upon the dial cooperating with said pointer, said barometric scale bearing such relation to the pressure scale of the dial as to cause the movement of the dial as determined by said barometric scale to compensate for variations in atmospheric pressure in the resultant reading of the gauge, whereby the reading of the gauge will indicate the pressure in pounds per square inch above the then existing zero of atmospheric pressure.

3. A structure as recited in claim 2 wherein the pointer upon the case is movable with respect to the case.

4. A gauge comprising a rotatable dial, an indicator operative thereover, a pressure scale upon the dial with which the indicator cooperates graduated in terms of absolute pressure, a barometric scale upon the dial and so related to the pressure scale thereof that when the dial is rotated to a degree indicated by the barometric scale variations in the prevailing atmospheric pressure are compensated for in the reading upon the pressure scale, and means for manually rotating said dial.

5. A structure as recited in claim 4 wherein the means for rotating the dial comprises a screw, a projection upon the dial against which said screw acts and a spring tending to move the dial in such direction as to bring said projection against the screw.

6. A gauge comprising a casing, a dial rotative with respect to said casing and having a scale thereon graduated in terms of absolute pressure, a pointer operative over said dial and cooperating with said scale, a barometric scale upon the dial, a pointer cooperating with said barometric scale and a binding screw for said pointer, said screw being movable in a slot formed in the case of the gauge and manually operable means for moving the dial with respect to the last named pointer, the graduations of the barometric scale being so related to the graduations of the first named scale that when the dial is shifted in accordance with the indications of the barometric scale the degree of movement thereof will be such as to compensate for variations in atmospheric pressure in the resultant reading of the first named pointer upon the first named scale.

7. A gauge comprising a movable dial having a pair of scales thereon one of which is graduated in terms of absolute pressure in pounds per square inch and the other of which is graduated in terms of inches of mercury manually operative means for moving said dial, a pressure indicator movable over said dial and cooperating with said scales and a barometric scale upon said dial and graduations of which are so related to the graduations of the aforesaid scales as to compensate for variations of atmospheric pressure in the resultant reading upon said scales when the dial is manually shifted under the guidance of such barometric scale.

In testimony whereof I hereunto affix my signature.

C. HAROLD BERRY.